United States Patent
Karaoguz (10) Patent No.: US 7,289,813 B2
(45) Date of Patent: Oct. 30, 2007

(54) USING SIGNAL-GENERATED LOCATION INFORMATION TO IDENTIFY AND LIST AVAILABLE DEVICES

(75) Inventor: Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 245 days.

(21) Appl. No.: 10/314,287

(22) Filed: Dec. 9, 2002

(65) Prior Publication Data

US 2004/0203931 A1  Oct. 14, 2004

Related U.S. Application Data

(60) Provisional application No. 60/409,958, filed on Sep. 12, 2002.

(51) Int. Cl.
*H04Q 7/20* (2006.01)
*H04B 7/00* (2006.01)
*G01S 5/14* (2006.01)

(52) U.S. Cl. .............................. 455/456.1; 455/456.2; 455/457; 455/41.2; 455/41.3; 342/357.08

(58) Field of Classification Search ........... 340/539.13; 342/357.07, 357.08; 251/129.04; 455/456.1, 455/41.2–41.3, 456.2, 457
See application file for complete search history.

(56) References Cited

U.S. PATENT DOCUMENTS

| 5,838,926 | A | 11/1998 | Yamagishi |
| 6,414,635 | B1 | 7/2002 | Stewart et al. |
| 6,421,001 | B1 * | 7/2002 | Durst et al. ............. 342/357.07 |
| 6,665,712 | B2 * | 12/2003 | Pickup ....................... 709/219 |
| 6,731,214 | B2 * | 5/2004 | Kuo ........................ 340/573.1 |
| 2001/0029531 | A1 * | 10/2001 | Ohta ......................... 455/3.06 |
| 2001/0052995 | A1 * | 12/2001 | Idehara ...................... 358/1.15 |
| 2002/0094778 | A1 * | 7/2002 | Cannon et al. ............... 455/41 |
| 2002/0098852 | A1 | 7/2002 | Goren et al. |
| 2002/0171056 | A1 * | 11/2002 | Paese et al. ........... 251/129.04 |
| 2002/0198659 | A1 * | 12/2002 | Doyle et al. ................ 701/300 |
| 2003/0014138 | A1 * | 1/2003 | Ikeda et al. .................. 700/94 |
| 2003/0134645 | A1 * | 7/2003 | Stern et al. ................ 455/456 |

(Continued)

FOREIGN PATENT DOCUMENTS

| WO | WO 01/93434 | 12/2001 |
| WO | WO 01/97466 | 12/2001 |

OTHER PUBLICATIONS

Steve Steinke, Ultra Wideband Wireless Networks, Nov. 5, 2001, Internet Article.*

(Continued)

*Primary Examiner*—Lester G. Kincaid
*Assistant Examiner*—Marisol Figueroa
(74) *Attorney, Agent, or Firm*—Squire, Sanders & Dempey L.L.P.

(57) ABSTRACT

A signal-generated locator for locating at least one device can include a transmitter configured to transmit at least one first signal and a receiver configured to receive at least one second signal. In addition, the signal-generated locator can have a first processing unit configured to process the at least one second signal with respect to the at least one first signal, and a display unit configured to display information processed by the processing unit, wherein the information is related to at least one device.

6 Claims, 6 Drawing Sheets

U.S. PATENT DOCUMENTS

2005/0007251 A1* 1/2005 Crabtree et al. ....... 340/539.13
2005/0073522 A1* 4/2005 Aholainen et al. .......... 345/440
2006/0022796 A1* 2/2006 Striemer .................... 340/7.2

OTHER PUBLICATIONS

"IEEE 802.11, A Technical Overview," Pablo Brenner, BreezeNet website, Jul. 8, 1997, www.sss-mag.com/pdf/80211p.pdf.
Donny Jackson, Telephony, Ultrawideband May Thwart 802.11, Bluetooth Efforts, PRIMEDIA Business Magazines & Media Inc., Feb. 11, 2002.
Daniel L. Lough, et al., "A Short Tutorial on Wireless LANs and IEEE 802.11," The IEEE Computer Society's Student Newsletter, Virginia Polytechnic Institute and State University, Summer 1997, vol. 5, No. 2.
Dr. Robert J. Fontana, "A Brief History of UWB Communications," Multispectral.com, Multispectral Solutions, Inc., www.multispectral.com/history.html, Aug. 20, 2002.
Gerald F. Ross, "Early Motivations and History of Ultra Wideband Technology," Anro Engineering, Inc., Multispectral.com, Multispectral Solutions, Inc., www.multispectral.com/history.html, Aug. 20, 2002.
Dr. Terence W. Barrett, "History of UltraWideband (UWB) Radar & Communications: Pioneers and Innovators," Proceedings and Progress in Electromagnetics Symposium 2000 (PIERS2000), Cambridge, MA, Jul. 2000.
Dr. Henning F. Harmuth, "An Early History of Nonsinusoidal Electromagnetic Technologies," Multispectral.com, Multispectral Solutions, Inc., www.multispectral.com/history.html, Aug. 20, 2002.
Rebecca Taylor, "Hello, 802.11b AND Bluetooth: Let's Not Be Stupid!", ImpartTech.com, www.ImportTech.com/802.11-bluetooth.htm, Aug. 21, 2002.
Matthew Peretz, "802.11, Bluetooth Will Co-Exist: Study," 802.11-Planet.com, INT Media Group, Inc., Oct. 30, 2001.
"Bluetooth and 802.11: A Tale of Two Technologies," 10Meters.com, www.10meters.com/blue_802.html, Dec. 2, 2000.
Keith Shaw, "Bluetooth and Wi-Fi: Friends or foes?", Network World Mobile Newsletter, Network World, Inc., Jun. 18, 2001.
Joel Conover, "Anatomy of IEEE 802.11b Wireless," NetworkingComputing.com, Aug. 7, 2000.
Bob Brewin, "Intel, IBM Push for Public Wireless LAN," Computerworld.com, Computerworld Inc., Jul. 22, 2002.
Ernest Khoo, "A CNET tutorial: What is GPRS?", CNETAsia, CNET Networks, Inc., Feb. 7, 2002.
Les Freed, "Et Tu, Bluetooth?", ExtremeTech.com, Ziff Davis Media Inc., Jun. 25, 2001.
Bluetooth & 802.11b—Part 1, www.wilcoxonwireless.com/whitepapers/bluetoothvs802.doc , Jan. 2002.
Bob Brewin, "Report: IBM, Intel, Cell Companies Eye National Wi-Fi Net," Computerworld.com, Computerworld Inc., Jul. 16, 2002.
Bob Brewin, "Microsoft Plans Foray Into Home WLAN Device Market," Computerworld.com, Computerworld Inc., Jul. 22, 2002.
Bob Brewin, "Vendors Field New Wireless LAN Security Products," Computerworld.com, Computerworld Inc., Jul. 22, 2002.
Jeff Tyson, "How Wireless Networking Works," Howstuffworks.com, Howstuffworks, Inc., www.howstuffworks.com./wireless-network.htm/printable, Aug. 15, 2002.
Curt Franklin, "How Bluetooth Works," Howstuffworks.com, Howstuffworks, Inc., www.howstuffworks.com/bluetooth.htm/printable, Aug. 15, 2002.
802.11b Networking News, News for Aug. 19, 2002 through Aug. 11, 2002, 80211b.weblogger.com/, Aug. 11-19, 2002.
"Wireless Ethernet Networking with 802.11b, An Overview," HomeNetHelp.com, Anomaly, Inc., www.homenethelp.com/80211.b/index.asp, Aug. 20, 2002.
"Simple 802.11b Wireless Ethernet Network with an Access Point," HomeNetHelp.com, Anomaly, Inc., www.homenethelp.com/web/diagram/access-point.asp, Aug. 20, 2002.
"Simple 802.11b Wireless Ethernet Network without an Access Point," HomeNetHelp.com, Anomaly, Inc., www.homenethelp.com/web/diagram/ad-hoc.asp, Aug. 20, 2002.
"Cable/DSL Router with Wired and Wireless Ethernet Built In," HomeNetHelp.com, Anomaly, Inc., www.homenethelp.com/web/diagram/share-router-wireless.asp, Aug. 20, 2002.
"Bridging a Wireless 802.11b Network with a Wired Ethernet Network" HomeNetHelp.com, Anomaly, Inc., www.homenethelp.com/web/diagram/wireless-bridged.asp, Aug. 20, 2002.
"Wireless Access Point (802.11b) of the Router Variety," HomeNetHelp.com, Anomaly, Inc., www.homenethelp.com/web/diagram/share-wireless-ap.asp, Aug. 20, 2002.
Robert Poe, "Super-Max-Extra-Ultra-Wideband!", Business2.com, Oct. 10, 2000.
David G. Leeper, "Wireless Data Blaster," ScientificAmerican.com, Scientific American, Inc., May 4, 2002.
Steven J. Vaughan-Nichols, "Ultrawideband Wants to Rule Wireless Networking," TechUpdate.ZDNet.com, Oct. 30, 2001.
Jim Zyren and Al Petrick, "Brief Tutorial on IEEE 802.11 Wireless LANs," AN9829, Intersil Corporation, Feb. 1999.
"Overview of UWB?", PulseLink.net, Pulse~LINK, Inc., www.pulselink.net/ov_history.html, Sep. 4, 2002.
Robert X. Cringely, "The 100 Mile-Per-Gallon Carburetor—How Ultra Wide Band May (or May Not) Change the World," InterestingPeople.org, Jan. 26, 2002.
William A. Kissick, Editor, "The Temporal and Spectral Characteristics of Ultrawideband Signals," NTIA Report 01-383, Jan. 2001, www.its.bldrdoc.gov/pub/ntia-rpt/01-383/.
"Ultra Wide Band," www.ida.gov.sg/Website/IDAContent.nsf/dd1521fle79ecf3bc825682f0045a349/1856626048baf403c82569880267e26%3FOpenDocument+%22Full+duplex+UWB+handheldtransceiver%22&hl=en&ie=UTF-8, Aug. 20, 2002.
European Search Report dated Jul. 3, 2006.

* cited by examiner

USING SIGNAL-GENERATED LOCATION INFORMATION TO IDENTIFY AND LIST AVAILABLE DEVICES

CROSS REFERENCE TO RELATED APPLICATIONS

This application claims priority of U.S. Provisional Patent Application Ser. No. 60/409,958, entitled Using Signal-Generated Location Information to Identify and List Available Devices, filed Sep. 12, 2002. The contents of the provisional application are hereby incorporated by reference.

BACKGROUND OF THE INVENTION

1. Field of the Invention

The present invention relates to a method of and an apparatus for using signal-generated range and geographic position information to provide a list of available devices in a wireless communication network environment such as IEEE 802.11, BLUETOOTH™, Ultra-Wideband or any other wireless environment. In particular, the present invention relates to a method of and a system of using signals such as ultra-wideband (UWB) signals to locate and list available electronic devices within a network such as a wireless network. The present invention can be implemented in a wireless network device, which may include discrete devices or which may be implemented on a semiconductor substrate such as a silicon chip.

2. Description of the Related Art

Currently, cables and wires are predominantly used as the communication medium for transferring information such as voice, video, data, etc. from one source to another. For example, cables or wires are commonly used to set up networking infrastructures in business offices, and are also used for personal home computing, and for connecting to the Internet. Although cables and wires may provide an inexpensive and fast connection with a communication network, any device connected to such communication network by way of wires or cables must remain stationary or is restricted to movement by the length of the wire or cable.

Wireless technology offers mobility of a communication device that wired technology cannot. In a wireless communication infrastructure, each wireless device may freely move from one geographic area to another without having the communication disconnected or interrupted. As wireless services become popular, the usage thereof will increase. Accordingly, more and more wireless device will be used in public areas, such as cafes, airports, hotel lobbies, as well as in the office environments. Therefore, in order to enhance communication between mobile devices, it may be important to detect available mobile devices within a geographic area and to provide a listing thereof.

SUMMARY OF THE INVENTION

One example of the present invention can include a method of displaying information related to at least one device. The method can include the steps of activating a signal-generated locator, transmitting at least one first signal from the signal-generated locator, and receiving at least one second signal at the signal-generated locator. The method can further include the steps of processing the at least one second signal with respect to the at least one first signal, and displaying information related to at least one device.

In another example, the present invention can relate to a signal-generated locator locating at least one device. The signal-generated locator can have a transmitter configured to transmit at least one first signal, and a receiver configured to receive at least one second signal. In addition, the signal-generated locator can have a first processing unit configured to process the at least one second signal with respect to the at least one first signal, and a display unit configured to display information processed by the processing unit, wherein the information is related to at least one device.

Furthermore, another example of the present invention can provide a system for displaying information related to at least one device. The system can include an activating means for activating a signal-generated locator, a transmitting means for transmitting at least one first signal from the signal-generated locator, and a receiving mean for receiving at least one second signal at the signal-generated locator. Also, the system can include a processing means for processing the at least one second signal with respect to the at least one first signal, and a display means for displaying information related to at least one device.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Figure 1:
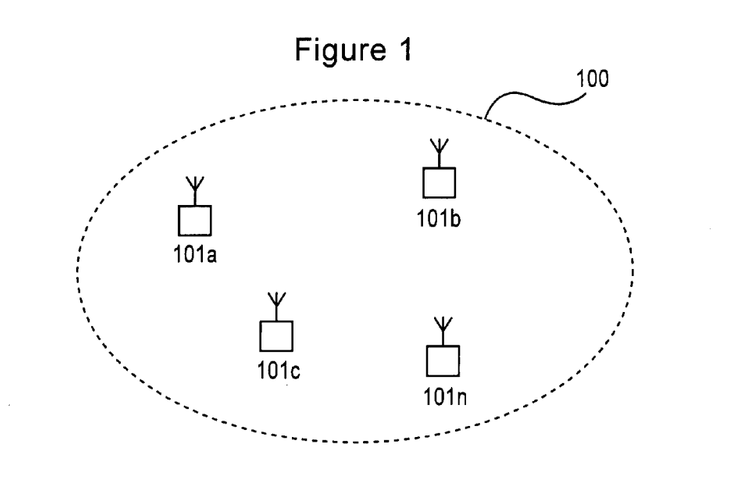
FIG. 1 illustrates one example of a wireless network configuration.

FIG. 1 illustrates one example of a wireless network. The wireless network of FIG. 1 can be an ad hoc network 100 having two or more wireless nodes, stations or devices 101a, 101b, 101c, . . . 101n therein (hereinafter, any reference to device(s) shall also include node(s) and/or station(s)). The ad hoc network 100 can be formed on a temporary basis whereby two or more wireless devices can recognize each other and can establish communications with each other. The wireless devices can be any wireless communication device configured to communicate with the Internet and having multimedia capabilities. For example, devices 101a, 101b, 101c, . . . 101n can be a smart phone, PDA, a mobile laptop computer, a web-pad, a digital video camera, an automobile equipped with a wireless communication device, or any mobile device. Within the ad hoc wireless network 100, each device can communicate with each other on a peer-to-peer level.

Figure 2:
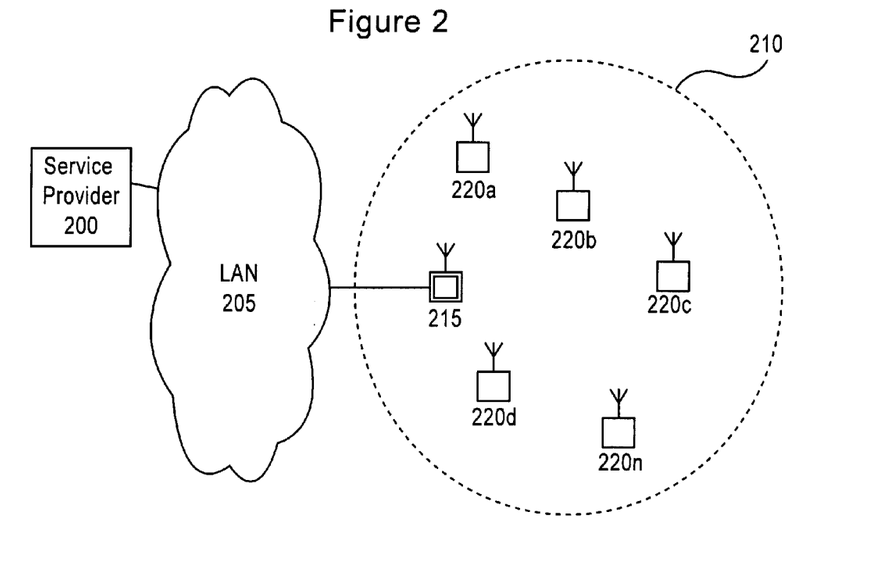
FIG. 2 illustrates another example of a wireless network configuration.

Another example of a wireless network is shown in FIG. 2. FIG. 2 provides a wireless infrastructure network 210 containing an Access Point 215 connected with a LAN 205, such as an Ethernet LAN. In addition, the wireless infrastructure network 210 can contain devices 220*a*, 220*b*, 220*c*, 220*d*, . . . 220*n*. The Access Point 215 is connected to the LAN 205 by wires or cables and can be formed as part of the wired network infrastructure 205, having at least one service provider 200. One function of the Access Point 215 can be a bridge or a connection between the wireless network 210 and the wired network 205. Accordingly, all communications between the devices 220*a*, 220*b*, 220*c*, 220*d*, . . . 220*n* or between the devices and the wired network 205 can go through Access Point 215.

The examples of wireless networks as illustrated in FIGS. 1 and 2 can use wireless technologies such as IEEE 802.11, BLUETOOTH™, UWB, etc.

Figure 3:
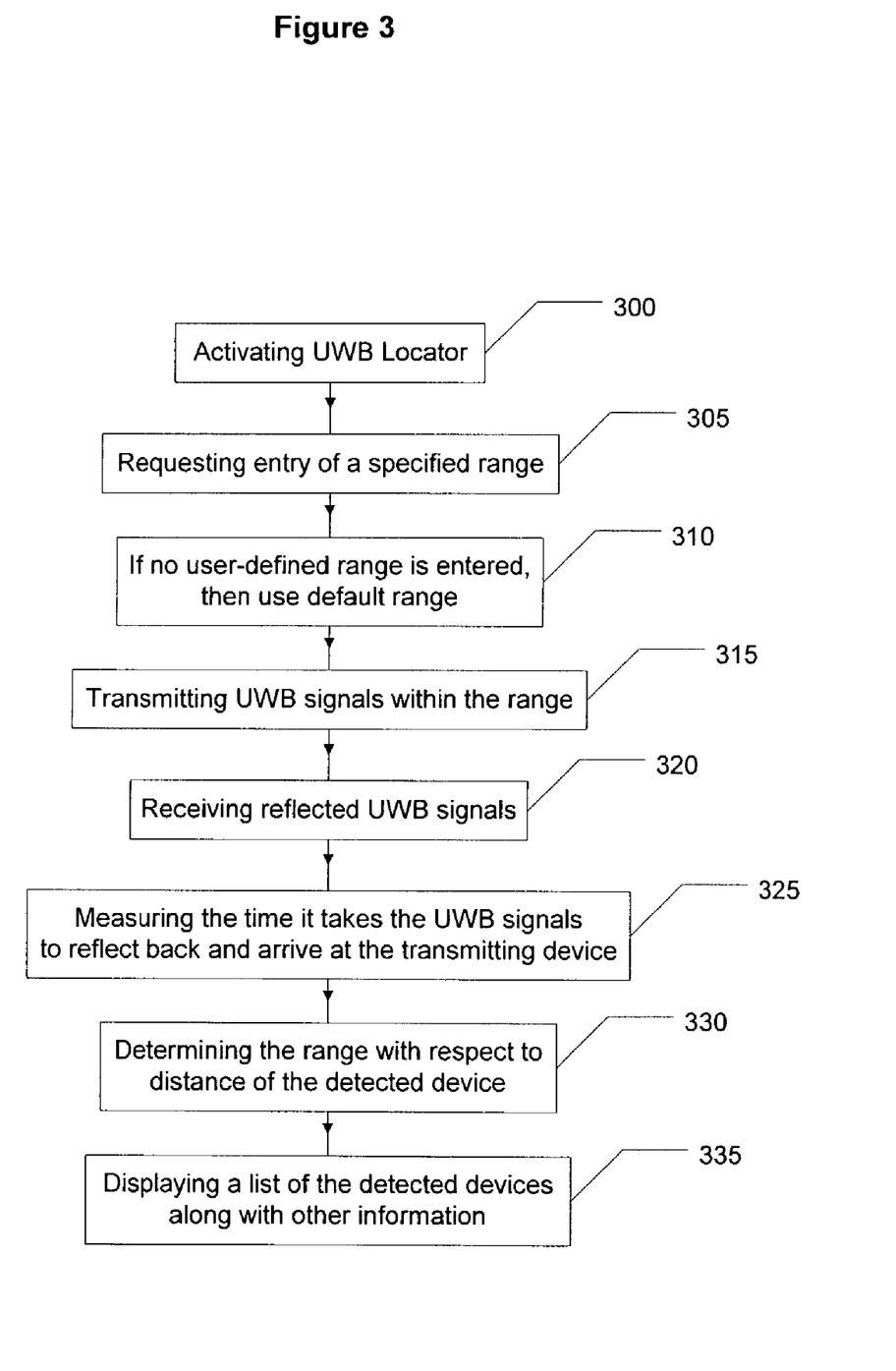
FIG. 3 illustrates a flow chart illustrating one example of a method of displaying information related to at least one device according to the present invention.

FIG. 3 illustrates one example of a method of displaying information related to one or more wireless device(s) pursuant to the present invention. Specifically, FIG. 3 illustrates one example of a method of displaying distance range information of one or more wireless device(s). The method of the present example can be implemented in hardware, or software, or a combination of both hardware and software.

As mentioned above, a wireless network configuration can contain two or more wireless devices therein. The wireless devices within a wireless network can communicate with each other or communicate with a wired network without being physically connected to wires or cables. In order to identify and list the available wireless devices for communication therewith, FIG. 3 of the present example illustrates one example of using signal-generated distance range information to identify and list available devices within a geographic area.

When a user having a wireless device enters a geographic area, the user can activate UWB device locator within the wireless device to commence identification and listing of available devices. This step of activating is provided in step 300 of FIG. 3. The UWB device locator can be integrated with any wireless device and can be, for example, a module within the wireless device. The module can be switched on or off. By activating the UWB device locator, the feature of detecting and listing available devices is switch to active mode.

Once the UWB device locator is activated, the device locator within the detecting wireless device can request the user to enter a specified distance range at step 305. If no user-defined distance range is provided, then the UWB device locator can identify a predetermined default distance range at step 310. The predetermined default distance range can be preprogrammed within the UWB device locator and stored in memory. In other words, the UWB device locator of the present example can provide the user with the option of either entering a specified distance range or using the default distance range to detect the available device. For instance, suppose an user knows he only wants to identify available devices within a distance range of 10 meters, the user can enter 10 meters when prompted with the request. On the other hand, if the user does not have a preference, then the user can provide no information when the UWB device locator requests for an entry, and thereby the default distance range can be used. It is noted UWB device locator can accept user-defined distance ranges less or equal to the default distance range.

Once the distance range is determined or identified, whether it is the user-defined distance range or the default distance range, the UWB device locator can transmit UWB signals within the distance range at step 315. The UWB device locator can transmit UWB signals in unidirectional mode or omni-directional mode. In addition, the UWB device locator can transmit UWB signals in short pulses with short duty cycles. Suppose for example the distance range is 10 meters. Thus, the UWB device locator can transmit short pulses within a 10 meters distance range.

FIG. 3 further shows the step of receiving reflected UWB signals at step 320. After the transmission of UWB signals, either uni-directionally or omni-directionally, the transmitted UWB signals can come into contact with one or more devices within the distance range, and thereafter the signals can reflect back to the UWB device locator where the reflected signals can be received by the receiver within the wireless device.

The UWB device locator can monitor and register the timing of the transmission of the signals as well as the timing of the propagation of the signals. For example, the UWB device locator can monitor and record the time each signal is transmitted. Once the transmitted signals are reflected back and received by the receiver, the UWB device locator can monitor and record the time each signal is received. Based on this information, the UWB device locator can measure the total time duration for a signal to travel from a transmitter of the UWB device locator to another device, and to reflect back and received by the receiver.

Based on this information and other factors, such as propagation delay, the direction and angle of the signal transmission, the speed at which the signal travels compared to the speed at which light travels, etc., the UWB device locator can process the information in a range processor to determine the distance range of one or more available device(s) at step 330. Once the distance range of other wireless devices are determined, the UWB device locator can display such information on a display to the user.

For instance, a user can enter a specific range of 20 meters after activating the UWB device locator. Thereafter, the device locator can begin to transmit UWB signals. Concurrently, the UWB device locator monitors and records the time of each transmission, records the direction and angle of the signal transmission, and monitors the time when the signals are reflected back. This information along with other factors can be processed through a range processor and the distance range of each available device within the detecting coverage area can be determined and displayed to the user.

Figure 4:
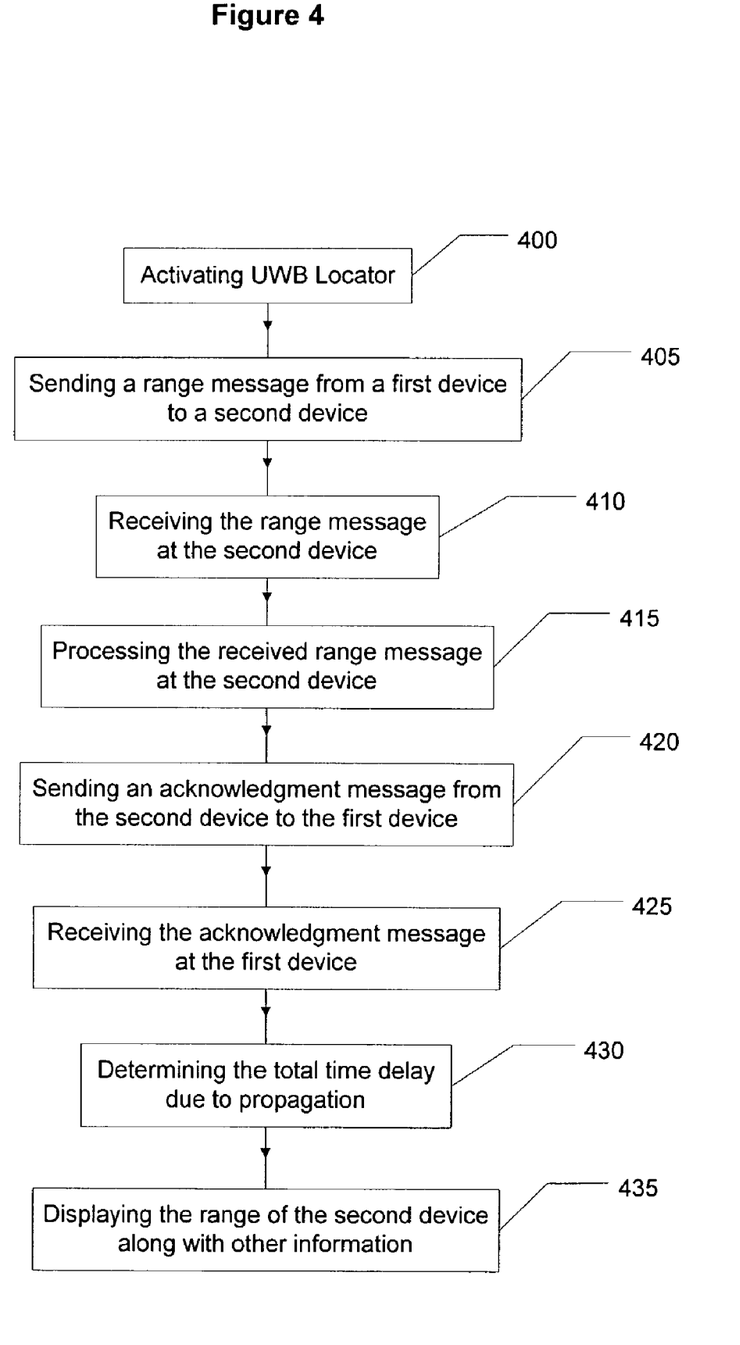
FIG. 4 illustrates a flow chart illustrating another example of a method displaying information related to at least one device according to the present invention.

FIG. 4 illustrates another example of a method of displaying information related to one or more wireless device(s) pursuant to the present invention. In particular, FIG. 4 illustrates another example of a method of displaying distance range information of one or more available device(s). The method of the present example can be implemented in hardware, or software, or a combination of both hardware and software.

An UWB device locator can be activated at step 400. Activating the UWB device locator can switch on the device locator to initiate the features of detecting and displaying available wireless devices. As mentioned above with respect to FIG. 3, the UWB device locator can be integrated with any wireless device, and can be, for example a separate module within a wireless device.

Once the UWB device locator is activated, the device locator can send one or more range message signal(s) to one or more wireless device(s) at step 405. The one or more range message signal(s) can be sent out from a transmitter within the wireless device. In addition, the range message signal(s) can be transmitted in short duty cycles at a starting time T, such as T=0. Similar to the example above, the transmission of the range message signals can be unidirectional or omni-directional.

After sending the range message signal(s), one or more available wireless device(s) can receive the range message signal(s) at a time T1. T1 for example, can be the sum of time T, the time of the processing delay $\Delta P$, and the time of the first propagation delay $\Delta T_1$. Thus, one of the available wireless devices can receive the range message signal at time T1, and can be represented as follows:

$$T1=T+\Delta P+\Delta T_1$$

Once the available wireless device receives the range message signal(s), the available wireless device can process the received range message at step 415. The available wireless device at the juncture can determine whether or not to establish communication with the originating device locator. Or the available wireless device can automatically response and attempt to establish communication with the originating device locator. Thereafter, the available wireless device can send a range message acknowledgement signal to the originating device locator at step 420. The range message acknowledgement signal can contain various information about the available device, such as the type of the device, protocol information, job queue information, etc. The available wireless device can send the range message acknowledgement signal at time T2. T2 for example, can be the sum of time T, the time of the processing delay $\Delta P$, the time of the first propagation delay $\Delta T_1$, and the turn-around time $\Delta TA$. The turn-around time $\Delta TA$ can represent the period of time from the time the available wireless device receives the range message signal to the time said available wireless device transmits the range message acknowledgement signal. Accordingly, time T2 can be represented as the following equation.

$$T2=T+\Delta P+\Delta T_1+\Delta TA$$

At time T2, a range message acknowledgement signal can be sent from an available wireless device to the originating UWB device locator. After the range message acknowledgement signal reaches the originating UWB device locator, the range message acknowledgement signal can be received by the receiver at step 425 of FIG. 4. Once the range message acknowledgment signal is received, the originating UWB device locator can determine a total time $T_{Total}$. The total time $T_{Total}$ can be the sum of time T2 and the second propagation time delay $\Delta T_2$. Accordingly, the total time $T_{Total}$ can be represented by the following equation.

$$T_{Total}=T2+\Delta T_2$$

Based on the total time $T_{Total}$, the information embedded within the range message acknowledgement signal, and other factors such as device related delays, the originating UWB device locator can determine the distance range of the available wireless device, and display or list the information on a display at step 435 for the user.

One embodiment of the above example can be embodied in an environment such as a hotel environment. The hotel environment of this example can be configured to have a wireless network infrastructure similar to the wireless network infrastructure as shown in FIG. 2. The wireless network infrastructure can, for example, be in a lobby of a hotel, and can contain an Access Point. The Access Point can be connected to a wired LAN, such as an Ethernet LAN. Suppose for example, a user having a mobile wireless device such as a PDA with a UWB device locator system incorporated therein enters the lobby of the hotel and desires to have access to a printer. Therefore, the user can activate the UWB device locator module in the PDA, which turns on the UWB locator system. Once the UWB device locator system is activated, the PDA can commence to transmit pulses of UWB range message signals in short duty cycles covering a specified range area.

Thereafter, the printer within the hotel lobby receives the range message signal sent by the user's PDA and automatically responds back by sending a range message acknowledgment signal embedded with various information such as the type of the printer, the printer queue, the data rate, etc. The user's PDA receives such acknowledgement signal and processes the acknowledgment signal to determine the distance range of the printer and data rates based in part on the total time $T_{Total}$ and other related information. Upon determining the distance range of the printer, the present embodiment can display the printer along with a list of other detected devices within the lobby of the hotel for the user.

Figure 5:
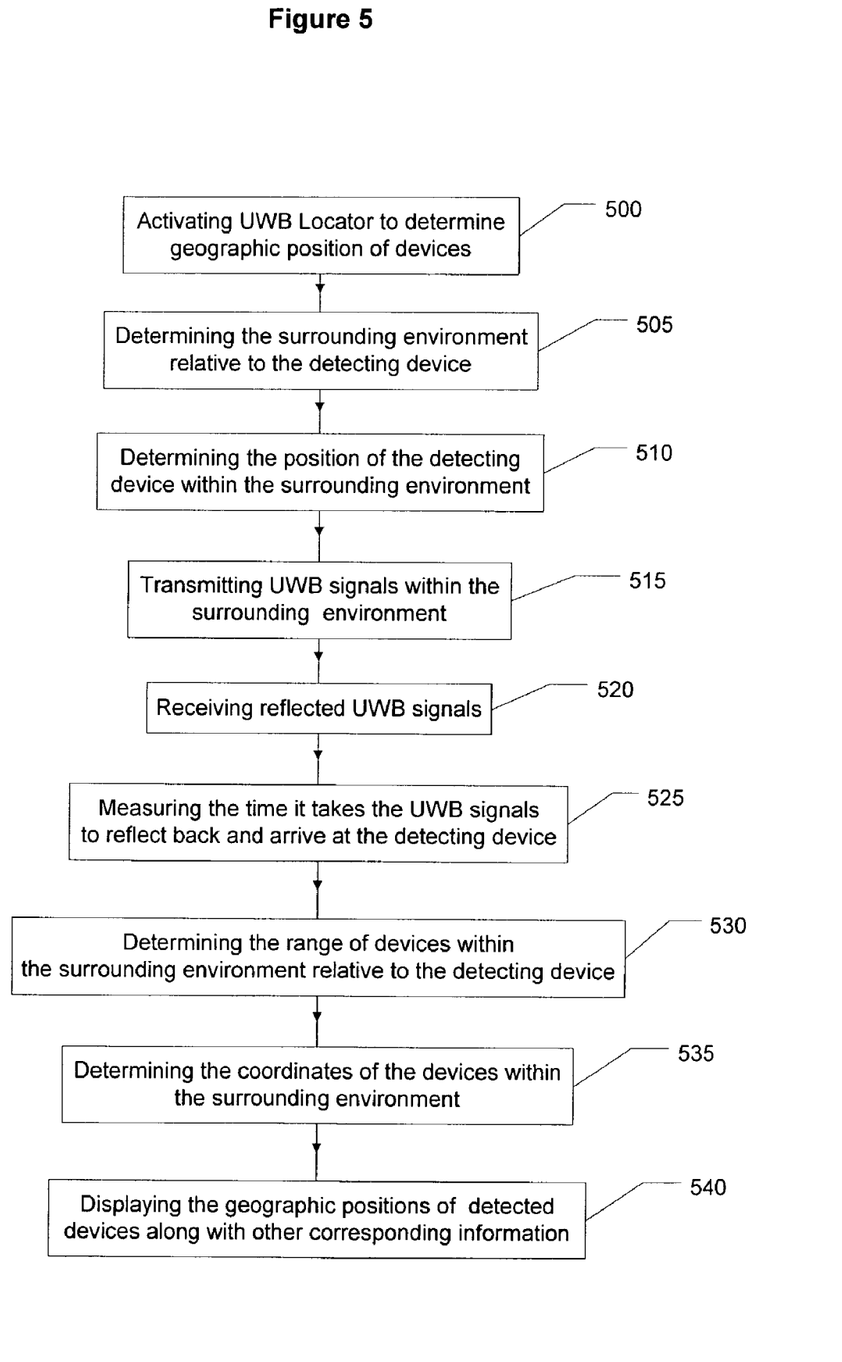
FIG. 5 illustrates a flow chart illustrating another example of a method displaying information related to at least one device according to the present invention.

FIG. 5 illustrates another example of a method of displaying information related to one or more wireless device(s) pursuant to the present invention. In particular, FIG. 5 illustrates one example of a method of displaying geographic position information of one or more available device(s). The method of the present example can be implemented in hardware, or software, or a combination of both hardware and software.

The UWB device locator can be activated at step 500 of FIG. 5. The UWB device locator of the present example can also be integrated with any wireless device, and therefore can be a separate module within a wireless device. In this example, when an UWB device locator is activated at step 500, the geographic position locator can be automatically switched on. In the alternative, the UWB device locator can, in another example, provide the user with the option to choose between a distance range detection mode or a geographic position detection mode. Whether the geographic position locator is automatically switched on or is selected by the user, the geographic position locator can determine the surrounding environment in relation to the detecting device at step 505. In other words, when the geographic position locator is activated, the geographic position locator can determine the geographic area surrounding the detecting device through geographic position unit or other positioning systems such as Global Positioning Systems. Suppose for example a user with a wireless device enters a coffee shop in a downtown area of Washington, D.C. Upon entering the coffee shop, the user activates the geographic position locator and selects the geographic position detection mode. The activation and selection of the geographic position locator accesses the geographic position unit wherein the geographic position unit determines that the surrounding environment of the user's wireless device is within the geographic vicinity of $17^{th}$ Street and L Street in downtown Washington, D.C. Once the surrounding geographic area of the detecting wireless device is determined, the geographic position locator can display a geographic map overlay of the area surround $17^{th}$ Street and L Street. This implementation, of course, can be applicable to any geographic location.

Next, the geographic position locator of the present example can determine it's own position in relation to the immediate surrounding environment at step 510. In other words, and continuing with the example above, the geographic position locator can detect the surrounding geographic environment within the coffee shop in relation to its own position therein. Therefore, the geographic position locator can for example transmit initial UWB detecting signals to detect the interior design or interior layout of the coffee shop. In an alternative example, the geographic position locator can establish communication with a Master device within the coffee shop such as an Access Point wherein the Master device can provide the interior design or interior layout instantly.

After determining the immediate surrounding geographic area in relation to its own position, the geographic position locator can commence the steps of determining the distance range of available wireless devices at step 530 by way of the examples mentioned above with respect to FIG. 3 and FIG. 4. The steps of determining the distance range can include step 515 of transmitting UWB signals within the surrounding environment, step 520 of receiving the reflected signals, step 525 of measuring the total time propagation time, etc.

Once the geographic position locator has identified the available wireless devices and has also determined the distance range of each available wireless devices in relation to its own position, the geographic position locator thereafter determines the coordinates of each available wireless device at step 535 based information such as the distance range information, the surrounding geographic environment information, the global geographic positioning information, etc.

Having determined the necessary information with respect to the geographic position of each available wireless device, the geographic position locator can display the geographic location of each available device on a display at step 540. In other words, the user can be provide with a display showing a geographic map overlay of the coffee shop, and indicated on the map overlay are the geographic positions of the available wireless devices within the coffee shop in relation to the user's own position therein.

Figure 6:
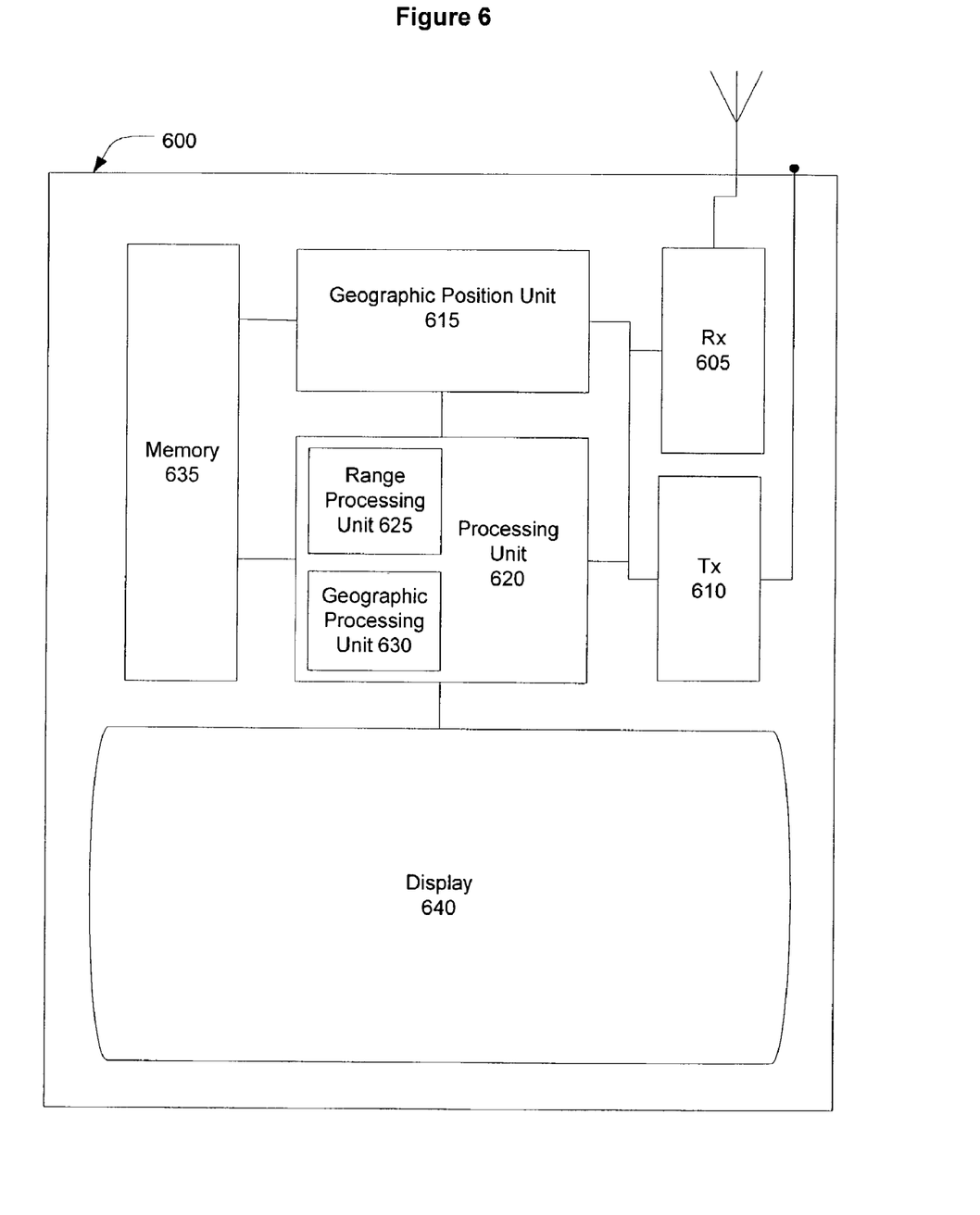
FIG. 6 illustrates one example of a hardware configuration for displaying information related to at least one device according to the present invention.

FIG. 6 illustrates one example of a hardware configuration that can detect, identify and display a list of available devices, in accordance with the present invention. In addition, the hardware configuration of FIG. 6 can be in an integrated, modular and single chip solution, and therefore can be embodied on a semiconductor substrate, such as silicon. Alternatively, the hardware configuration of FIG. 6 can be a plurality of discrete components on a circuit board. The configuration can also be implemented as a general purpose device configured to implement the invention with software.

FIG. 6 illustrates a signal-generated locator 600 configured to determine the distance range and/or determine the geographic position of available wireless devices, and displaying such information. The signal-generated locator 600 contains a receiver 605 and a transmitter 610. The transmitter 610 can transmit electromagnetic signals as well as various other signals such as UWB signals. The transmitter 610 can transmit UWB signals in short pulses in short duty cycles. In the alternative, the receiver 605 can receive electromagnetic signals as well as various other signals such as UWB signals.

Furthermore, the signal-generated locator 600 can include a geographic position unit 615 and a memory 635. The geographic position unit 615 can assist in the determination of global positioning in relation to the signal-generated locator 600. In other words, the geographic position unit 615 can assist in determining the surrounding geographic area of the signal-generated locator 600. Furthermore, the memory 635 can store information such as geographic maps, algorithms to determine distance range and coordinates, default values and look-up table, etc.

FIG. 6 also shows a processing unit 620, a range processing unit 625 and a geographic processing unit 630. It is noted that although the range processing unit 625 and the geographic processing unit 630 are shown to be within the processing unit 620, the range processing unit 625 and the geographic processing unit 630 can be separate and distinct processing units from the processing unit 620.

Therefore, the processing unit 620 can be the main processing unit and can process functions outside the realms of the range processing unit 625 and outside the realms of geographic processing unit 630, such as detecting a specified range or identifying a default range when the specified range is not detected, and etc. The range processing unit 625 can therefore perform all the functions and tasks related to the determining of the distance range of the available wireless devices. For instance, the range processing unit 625 can measure or calculate the period of time period from the time UWB signal is transmitted to the time the UWB signal is received. Similarly, the geographic processing unit 630 can perform all the functions and tasks related to the determining of the geographic position of the available wireless devices. These processing functions can include determining the geographic coordinates of the available wireless devices within the surrounding geographic environment of the signal-generated locator 600.

Furthermore, the example FIG. 6 includes a display 640. The display 640 can be a plasma display, a LCD display or various other types of display for displaying multimedia information.

Figure 7A:
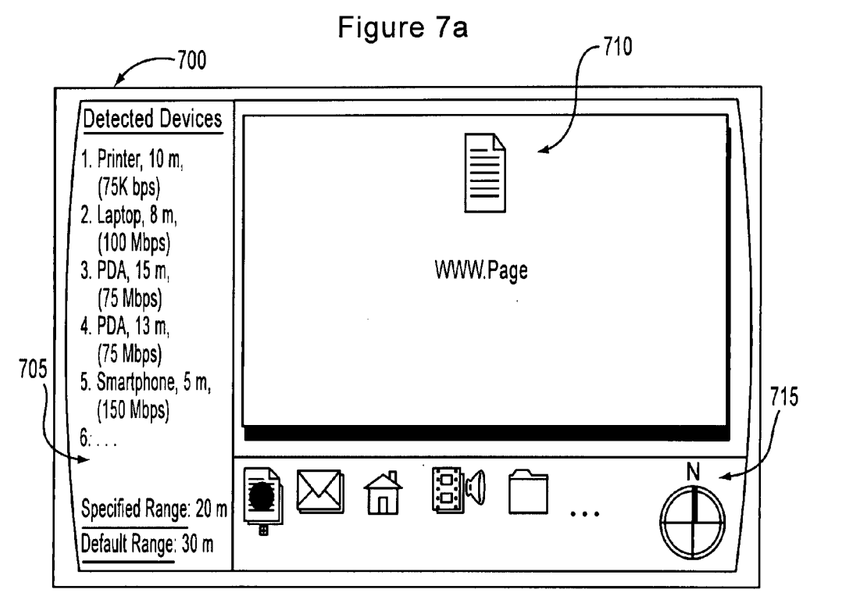
FIG. 7a illustrates one example of a display configuration for displaying information related to at least one device according to the present invention.
Figure 7B:
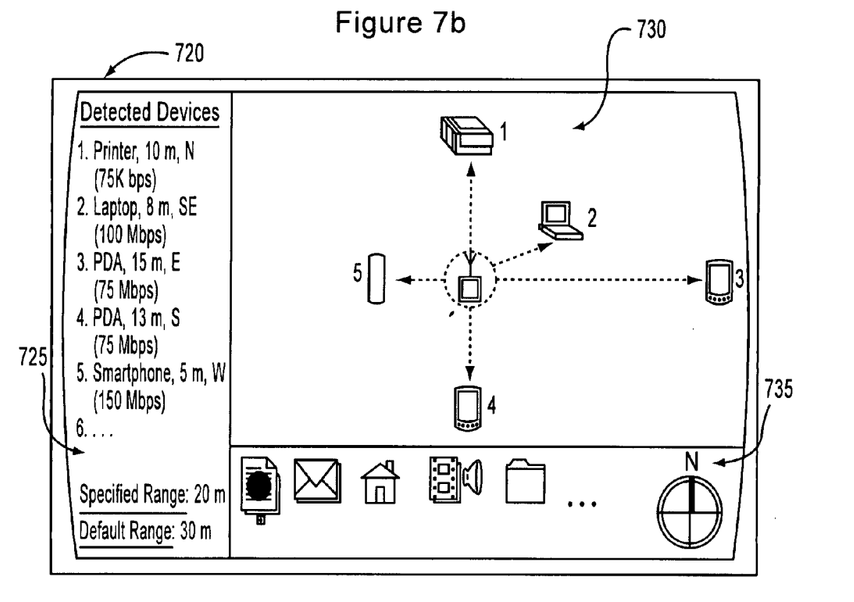
FIG. 7b illustrates another example of a display configuration for displaying information related to at least one device according to the present invention.

FIGS. 7a and 7b illustrates two examples of the display format in accordance with the present invention. FIG. 7a illustrates an example of a display format 700 showing the distance range and the data rates of each detected wireless device. In addition, FIG. 7b illustrates another example of a display format 720 showing the geographic positions and the data rates of each detected wireless device with a geographic area.

Main display area 710 of FIG. 7a can represent a main portion of the display 700 and can be used to display information related to a separate task running in tandem with the UWB device locator. For example, the main display area 710 can display a WWW web page if the user has accessed the Internet. In another example, the main display area 710 can display multimedia information from an e-mail received by the user.

Furthermore, display 700 of FIG. 7a can contain a listing display area 705. The listing display area 705 can display a list of the detected wireless devices. Within the listing display area 705, information such as the identification of the devices, the distance range of the devices in relation to its own position, and the data rates of each device can be provided. Also, the listing display area 705 can display the specified range if it was entered by the user and/or the default range if the specified range was not detected.

As mentioned above, FIG. 7b illustrates another example of a display 720 showing the geographic positions and the data rates of each detected wireless device with a geographic area.

The display of 720 of FIG. 7b can contain a main display area 730. The main display area 703 can display information related to separate task running in tandem with the UWB device locator, or the main display area 703 can display information with respect to the UWB device locator in a vector format or in a map overlay format, or a combination of both. For example, the main display area 730 can display a WWW web page if the user has accessed the Internet. In another example, the main display area 730 can display multimedia information from an e-mail received by the user. In the alternative, the main display area 730 can display each and every detected device in relation to the locator's position. In other words, the main display area 730 can provide a map overlay of the surrounding geographic area and can indicate on the map-overly the position of each detected device within the surrounding geographic area. Furthermore, the main display area 730 can provide pointers indicating the geographic location of each device in a vector format.

Furthermore, the display 720 can include a listing display area 725. Similar to the listing display area 725 of FIG. 7*a*, the listing display area 725 of FIG. 7*b* can display a list of the detected wireless devices. Within the listing device area 725, information such as the identification of the devices, the distance range of the devices in relation to its own position, the coordinates of the device, and the data rates of each device can be provided. Also, listing device area 725 can display the specified range if it was entered by the user and/or the default range if the specified range was not detected.

As for display area 715 and display area 735 of FIGS. 7*a* and 7*b* respectively, these display areas 715 and 735 can display icons and/or tools for accessing specific applications or functions. These icons can either be related to the UWB signal-generated device locator or can be separate application modules unrelated to the device locator. For example, a user can access the e-mail feature by actuating the mail envelope icon, or the user can actuate the house icon to establish a connection with the Internet and access a home page.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A method of displaying information related to at least one device, said method comprising the steps of:
   activating a signal-generated locator;
   transmitting at least one first signal from the signal-generated locator;
   receiving at least one second signal at the signal-generated locator;
   processing the at least one second signal with respect to the at least one first signal;
   determining a distance range with respect to the at least one device,
   determining a geographic position with respect to the at least one device;
   displaying information related to at least one device;
   determining a location of the signal-generated locator in relation to a global position; and
   determining a surrounding environment within a predetermined radius in relation to the location of the signal-generated locator,
   wherein the step of displaying information related to the at least one device comprises displaying the geographic position with respect to the at least one device,
   wherein the step of receiving the at least one second signal comprises receiving a reflected signal reflecting back from the at least one device,
   wherein the step of processing the at least one second signal comprises identifying a starting time corresponding to the transmission of the at least one first signal, determining a propagation time corresponding to the at least first signal and corresponding to the at least second signal and determining a set of geographic coordinates related to the location of the at least one device, and
   wherein the step of determining the geographic position with respect to the at least one device comprises determining the geographic position with respect to the at least one device based on the starting time, the propagation time and the set of geographic coordinates.

2. The method of claim 1, wherein the step of displaying information related to the at least one device comprises the step of:
   displaying the geographic position with respect to the at least one device having a geographic map overlay.

3. A signal-generated locator for locating at least one device, said signal-generated locator comprising:
   a transmitter configured to transmit at least one first signal;
   a receiver configured to receive at least one second signal;
   a first processing unit configured to process the at least one second signal with respect to the at least one first signal;
   a display unit configured to display information processed by the processing unit, wherein the information is related to at least one device,
   wherein the first processing unit comprises a second processing unit configured to determine a distance range with respect to the at least one device and a third processing unit configured to determine a geographic position with respect to the at least one device,
   wherein the display unit is configured to display the geographic position with respect to the at least one device,
   further comprising a geographic position unit configured to determine a location of the signal-generated locator in relation to a global position, and configured to determine a surrounding environment within a predetermined radius in relation to the location of the signal-generated locator,
   wherein the receiver is configured to receive a reflected signal back from the at least one device,
   wherein the second processing unit is configured to identify a starting time corresponding to the transmission of the at least one first signal and is configured to determine a propagation time corresponding to the at least first signal and corresponding to the at least second signal,
   wherein the third processing unit is configured to determine a set of geographic coordinates related to the location of the at least one device based on the location, the surrounding environment, and the distance range, and
   wherein the third processing unit is configured to determine the geographic position based on the starting time, the propagation time and the set of geographic coordinates.

4. The signal-generated locator of claim 3, wherein the display unit is configured to display the geographic position having a geographic map overlay provided by the geographic position unit.

5. A system of displaying information related to at least one device, said system comprising:
- an activating means for activating a signal-generated locator;
- a transmitting means for transmitting at least one first signal from the signal-generated locator;
- a receiving mean for receiving at least one second signal at the signal-generated locator;
- a processing means for processing the at least one second signal with respect to the at least one first signal;
- a display means for displaying information related to at least one device; and
- a first determining means for determining a distance range with respect to the at least one device,
- wherein the display means displays the distance range with respect to the at least one device,
- wherein the transmitting means transmits at least one message signal in duty cycles at a starting time,
- wherein the receiving means receives the at least one acknowledgment signal sent from the at least one device at a turn-around time,
- wherein the processing means identifies the starting time and the turn-around time, and determines a processing delay time with respect to the at least one device, and determines a total delay time with respect to the at least one message signal and with respect to the at least one acknowledgment signal,
- wherein the first determining means determines the distance range with respect to the at least one device based on the starting time, the turn-around time, the processing delay time and the total delay time,
- further comprising a second determining means for determining a geographic position with respect to the at least one device,
- wherein the displaying means displays the geographic position with respect to the at least one device,
- wherein the second determining means determines a location of the signal-generated locator in relation to a global position, and determines a surrounding environment within a predetermined radius in relation to the location of the signal-generated locator,
- wherein the receiving means receives a reflected signal reflecting back from the at least one device,
- wherein the processing means identifies a starting time corresponding to the transmission of the at least one first signal, determines a propagation time corresponding to the at least first signal and corresponding to the at least second signal; and determines a set of geographic coordinates related to the location of the at least one device, and
- wherein the second determining means determines the geographic position with respect to the at least one device based on the starting time, the propagation time and the set of geographic coordinates.

6. The system of claim 5, wherein the displaying means displays the geographic position with respect to the at least one device having a geographic map overlay.

* * * * *